CORRELATION CIRCUIT
Filed July 3, 1961 8 Sheets-Sheet 1
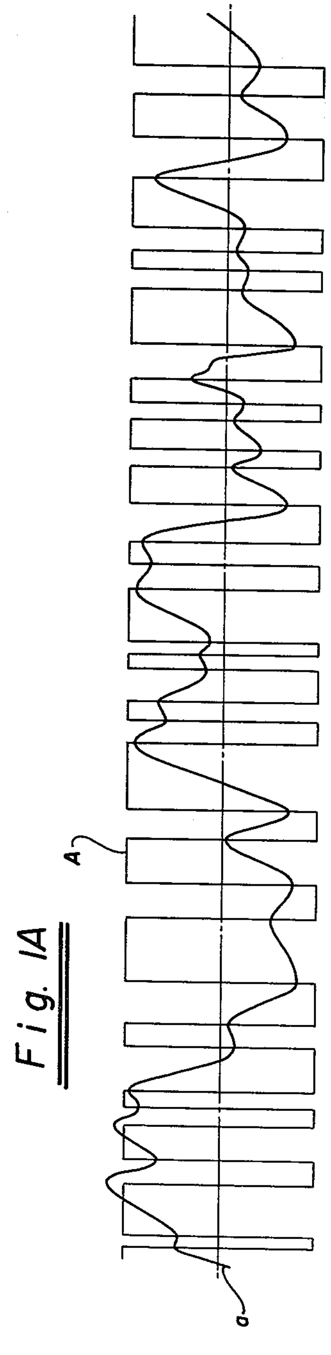
Fig. IA
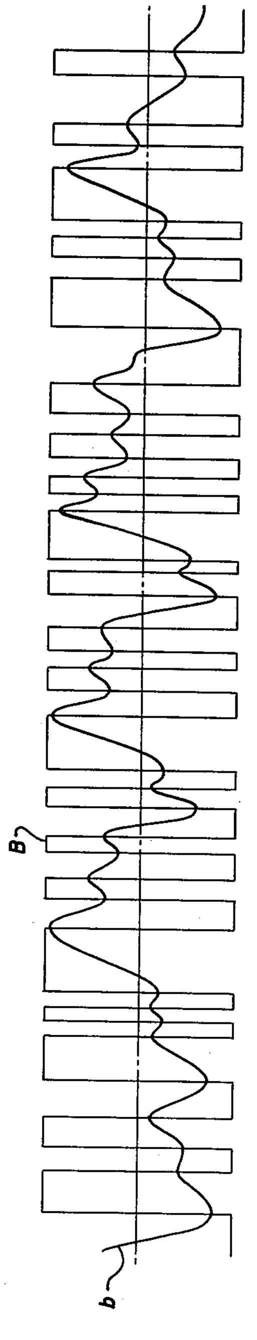
Fig. IB
INVENTORS
MORRIS M. BIRNBAUM
PHIL M. SALOMON
BY [signature] ATTY
[signature] AGENT

INVENTOR.

BY

INVENTOR.

BY

Dec. 17, 1963 M. M. BIRNBAUM ETAL 3,114,831

CORRELATION CIRCUIT

Filed July 3, 1961 8 Sheets-Sheet 4

INVENTOR.

BY

INVENTOR.

BY

INVENTOR.

BY

Dec. 17, 1963 M. M. BIRNBAUM ETAL 3,114,831

CORRELATION CIRCUIT

Filed July 3, 1961 8 Sheets-Sheet 7

INVENTOR.

BY

CORRELATION CIRCUIT

Filed July 3, 1961 8 Sheets-Sheet 8

INVENTOR.

BY

United States Patent Office 3,114,831
Patented Dec. 17, 1963

3,114,831
CORRELATION CIRCUIT

Morris M. Birnbaum, Pasadena, and Phil M. Salomon, Sunland, Calif., assignors to General Precision, Inc., a corporation of Delaware Filed July 3, 1961, Ser. No. 121,562
4 Claims. (Cl. 235—181)

The present invention relates to correlation arrangements, i.e. arrangements for sensing and indicating areas of identity (or near identity) in the trend of two continuously varying signals.

It is an object of the invention to provide a new, improved and dependably operating method of, and arrangement for, comparing two continuously varying signals with a view to determining and indicating areas of identity in the trends thereof.

Another object of the invention is to provide an arrangement for processing a continuously varying signal to convert it into a form in which it may readily be compared electronically with other identically processed signals to ascertain areas of identity in the trend thereof.

Still another object of the invention is to provide an arrangement for correlating two continuously varying signals in such a manner that the effects of random noise components in the signals are automatically balanced out and do not materially affect the dependability of the results obtained.

Furthermore, it is an object of the invention to provide a correlation arrangement, of the type referred to, wherein spurious similarities in the trends of the compared signals are automatically balanced out and do not materially affect the dependability of the results obtained.

These and other objects of the present invention will be apparent from the following description of the accompanying drawings which illustrate certain preferred embodiments thereof and wherein:

FIGURES 1A and 1B illustrate two continuously varying signals, and superimposed thereonto square wave pulse signals into which they are converted in accordance with the invention to facilitate correlation thereof;

Figure 7A:
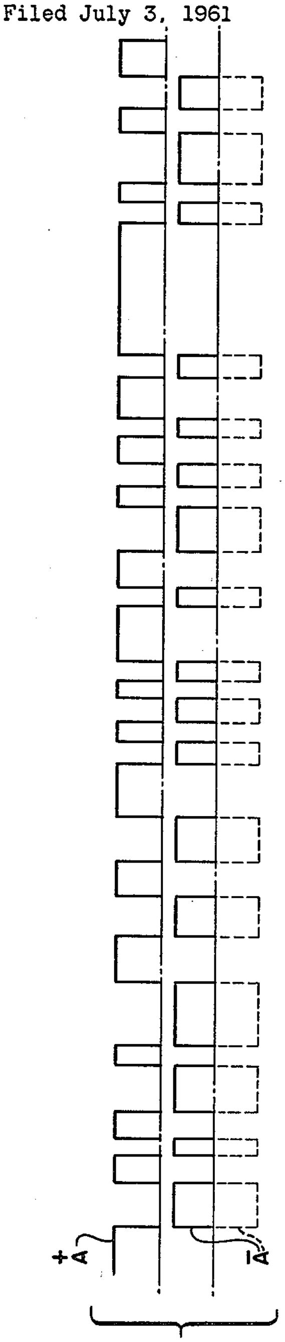
FIGURES 7A and 7B illustrate the positive and negative components of the two pulse signals shown in FIGURES 1A and 1B respectively.
Figure 7B:
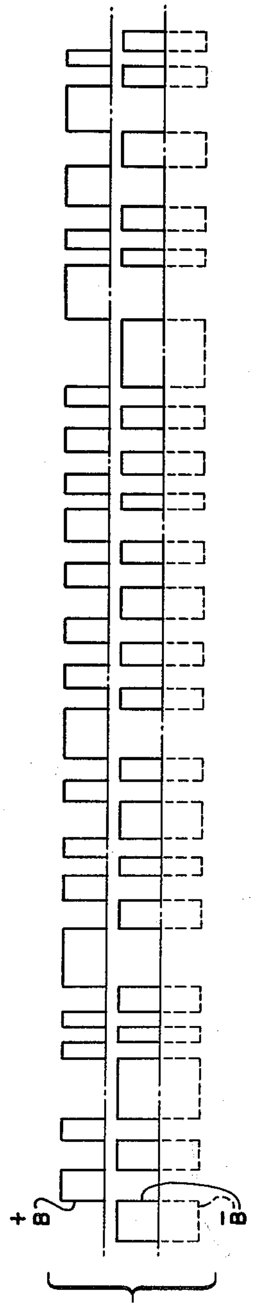
Figure 8A:
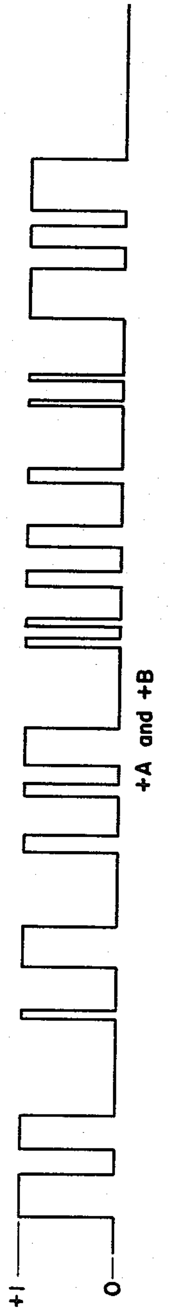
Figure 8B:
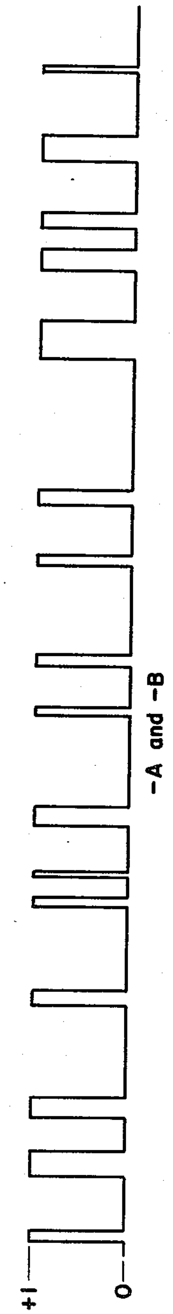
Figure 8C:
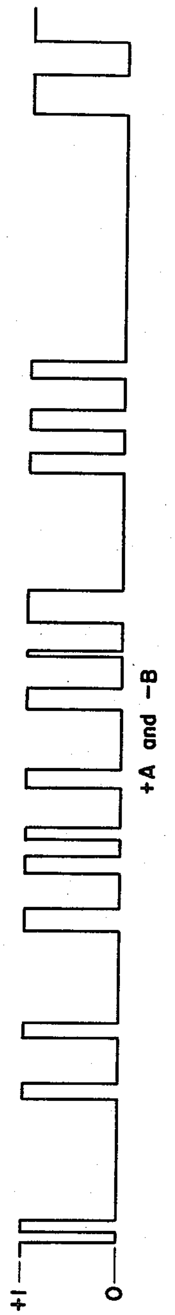
Figure 8D:
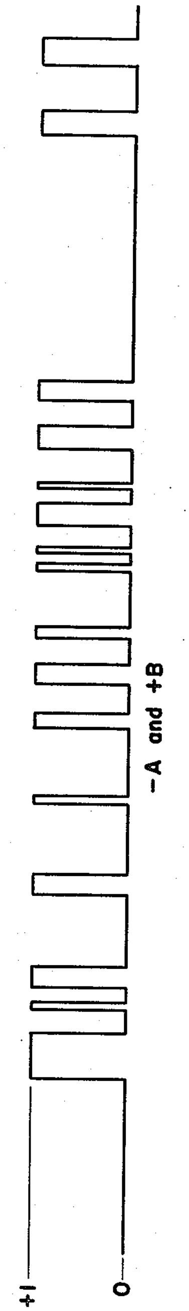
Figures 9, 10, 11:
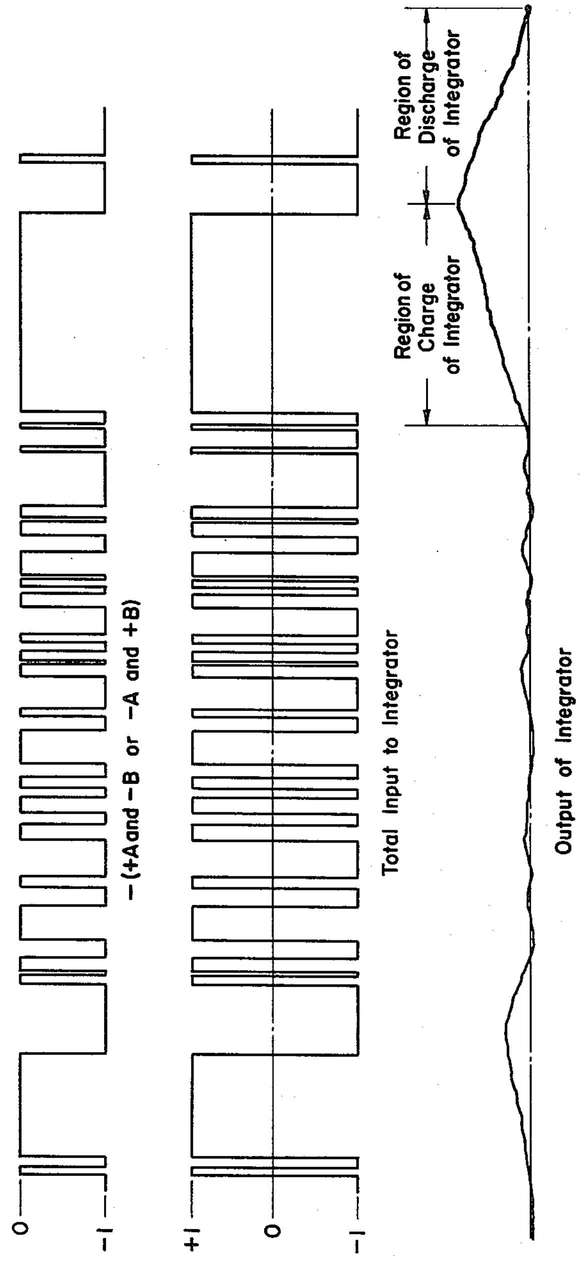
Figure 12:
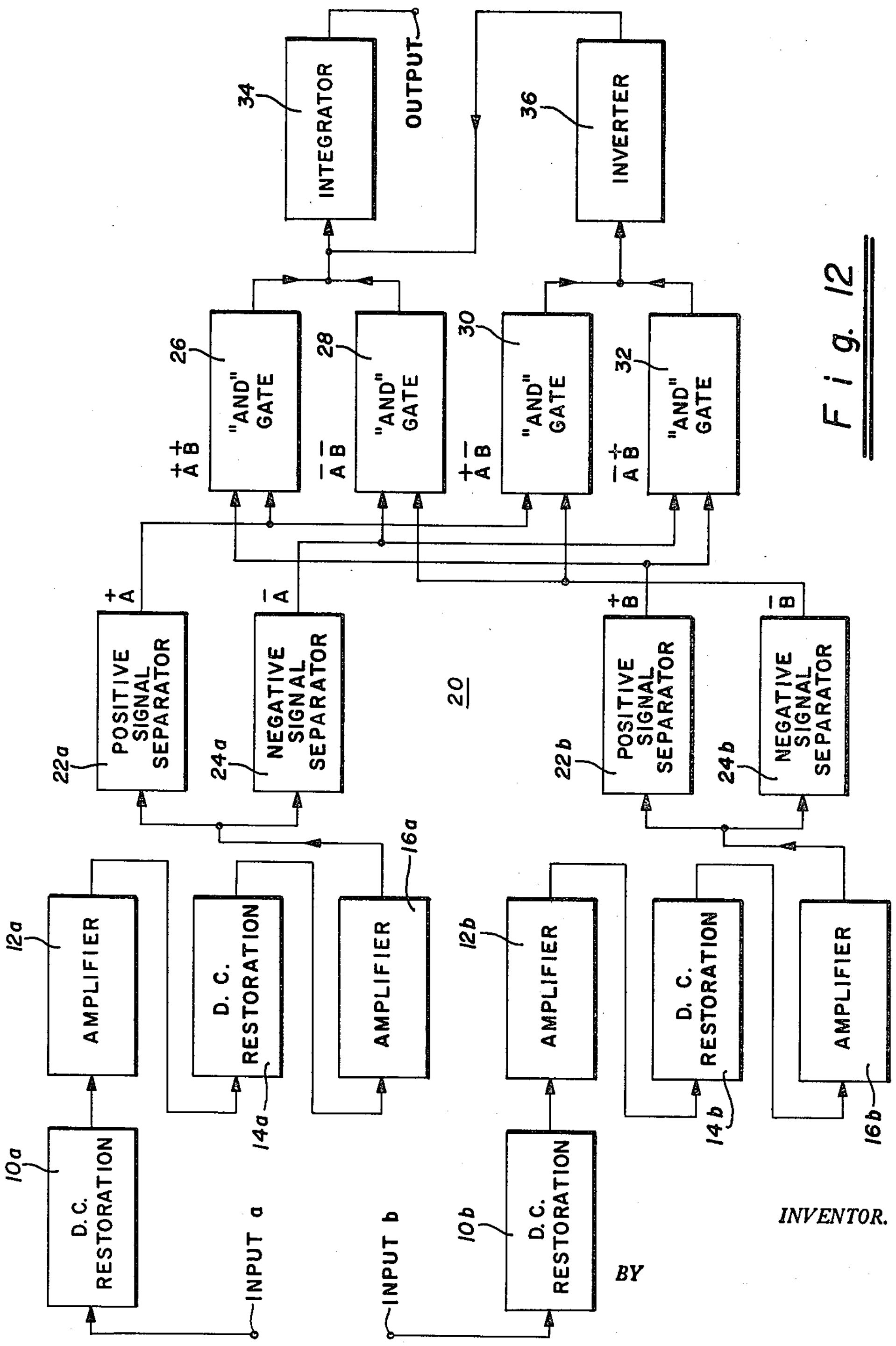
Figure 13:
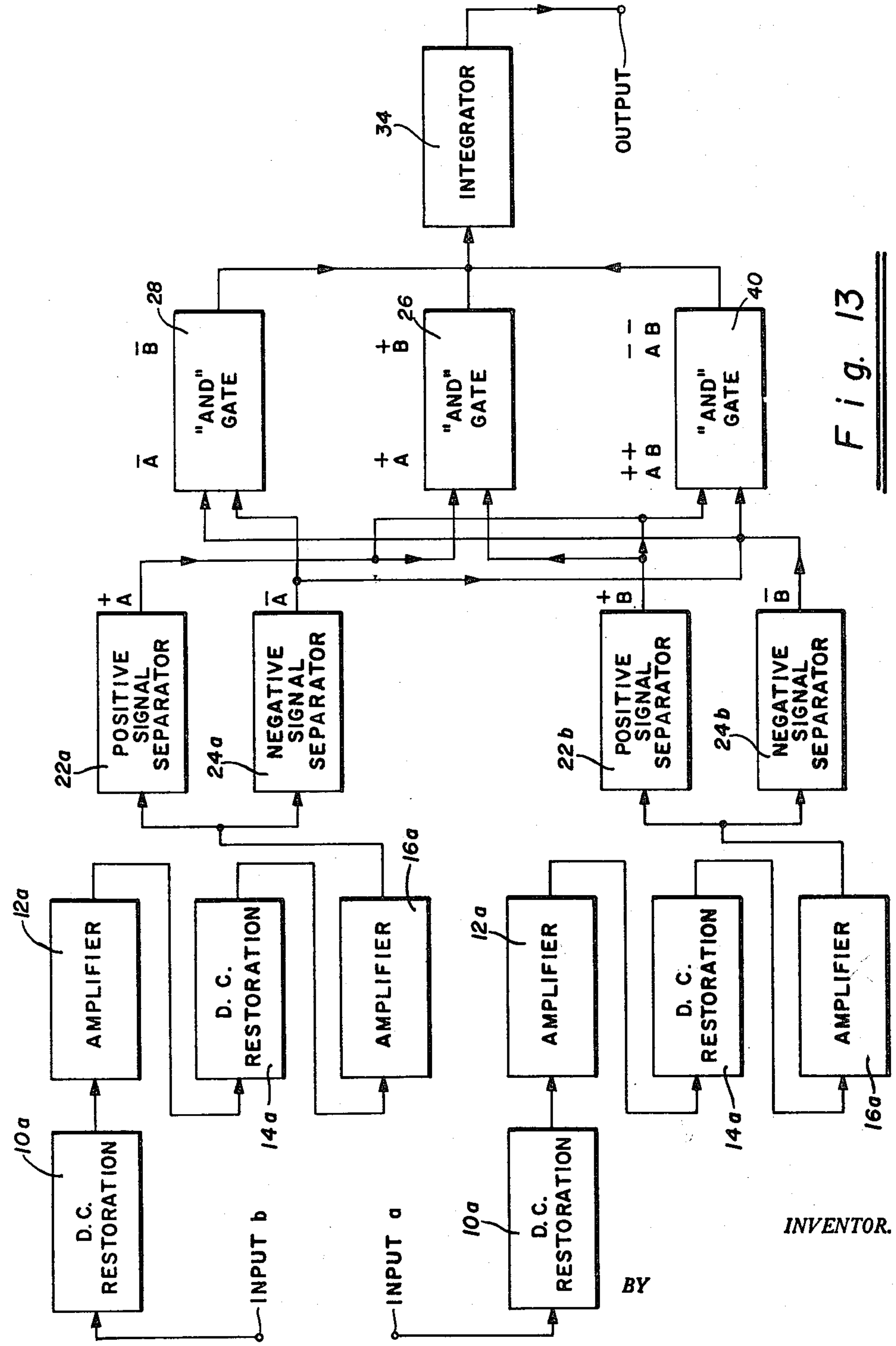
Figure 14:
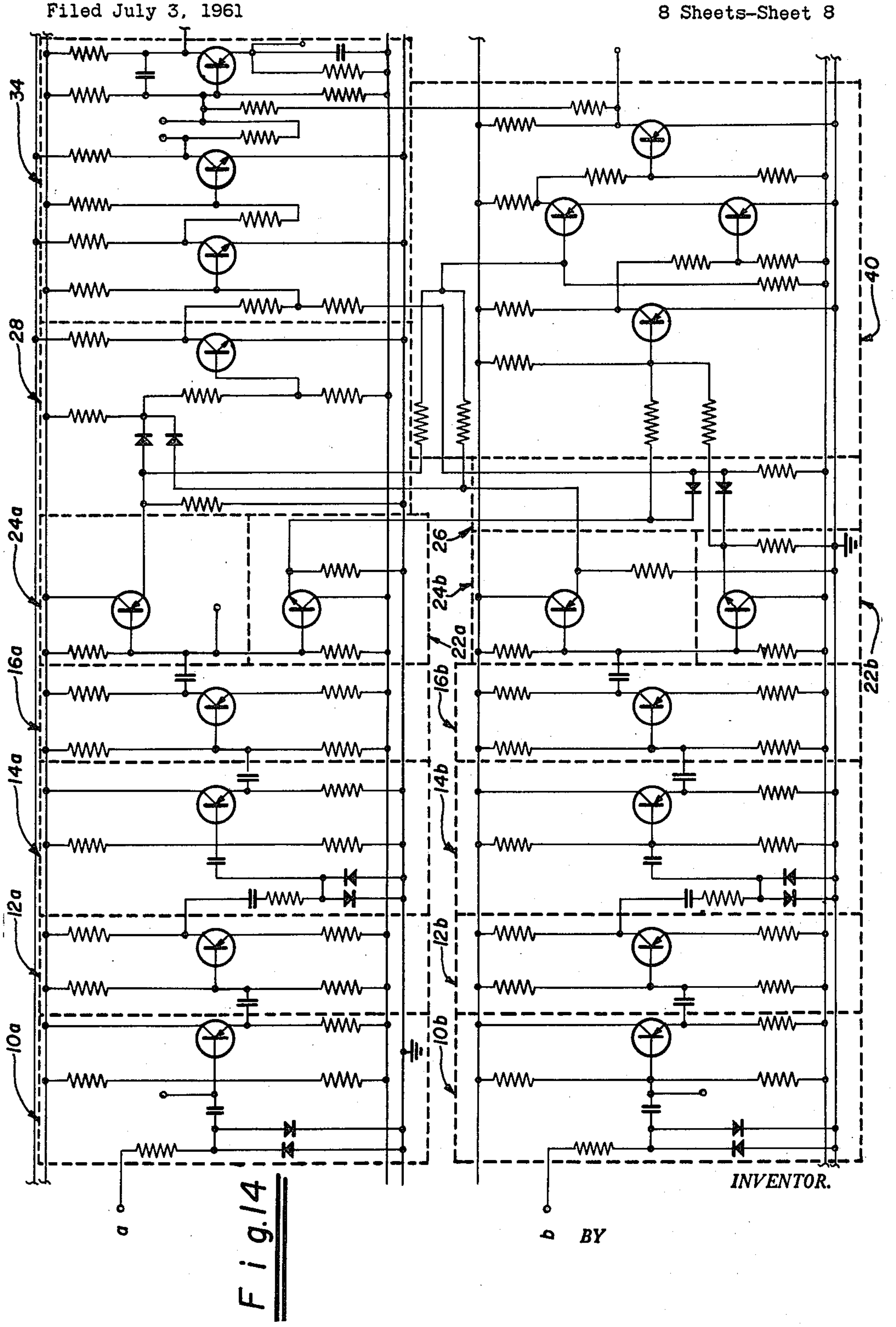

FIGURES 8A, 8B, 8C, and 8D show the outputs of the individual gates of the correlation arrangement of the present invention to which the component signals illustrated in FIGURES 7A and 7B are applied for comparison;

FIGURE 9 is a graph illustrating the composite signal resulting from consolidation and inversion of the component signals shown in FIGURES 8C and 8D;

FIGURE 10 illustrates the composite signal resulting from consolidation of the signals shown in FIGURES 8A, 8B and 9;

FIGURE 11 shows the averaged output of an integrator to which the signal illustrated in FIGURE 10 has been applied and indicates the existence of a correlation excess;

FIGURE 12 is a block diagram illustrating an arrangement for processing and comparing two continuously varying signals in accordance with our invention;

FIGURE 13 is a block diagram similar to FIGURE 12 illustrating a modified embodiment of the invention; and FIGURE 14 is a detailed diagram of a practical circuit arrangement of the type shown in FIGURE 13.

In accordance with our invention we first convert the signals to be correlated into a form in which it is easy to compare them electronically for similarities in their trends. The "trend" of a signal, as the term is used herein, and in the claims, means an increase in magnitude or, alternatively, a decrease in magnitude, without reference to the direction of flow of the current. Thus, the trend of a signal changes when its magnitude ceases to increase and begins to decrease, or vice versa; but does not change when a signal of increasing, or decreasing, magnitude changes polarity. To this end, any reversals in the trends of the signals in positive or negative direction are converted into positive and negative square wave pulses of equal amplitude irrespective of the extent to which the original signals move in one or the other direction and irrespective of the grade or steepness of such movement, but of different phases, i.e. different duration and intervals, depending upon where a change in the trend of the signals occurred and how long the new trend continued. The resultant series of positive and negative square wave pulses are easy to compare electronically for similarities. FIGURES 1A and 1B show two continuously varying video signals *a* and *b*, and superimposed upon them as lines A and B, respectively, the corresponding series of square wave pulses into which they are converted in accordance with the invention prior to the actual correlation operation. In accordance with the invention, we deliver the signals thus converted to an array of "and" gates, for comparison, i.e. an array of gates devised to supply an output pulse whenever two pulses appear simultaneously at its input side. If the signals were delivered to a single "and" gate for comparison, such a gate would pass pulses whenever true correlation existed between the signals applied to it, but it would also supply a pulse when two pulses are simultaneously applied to its input side, which represent spurious similarities of short duration in the trends of the compared signals and/or the coincidence of random noise components in the compared signals, a misleading operation that may be termed "false" correlation. In accordance with the invention we device a correlation arrangement wherein pulses passed due to the coincidence of noise components in the compared signals and due to spurious similarities between said signals are automatically balanced out.

Proceeding from the assumption that the coincidence of random noise components of two signals will occur as often at opposite polarity as at the same polarity, and that spurious similarities in the compared signals are liable to occur with the same frequency at opposite polarity as at the same polarity, we provide a gate arrangement that supplies an output pulse whenever two pulses are simultaneously applied to its input side irrespective of whether the pulses are of the same or opposite polarity; and by inverting the pulses passed by the gate arrangement whenever coincident pulses of opposite polarity appear at the input side of said arrangement, and integrating and averaging all the pulses passed by the gate arrangement in a common integrator, the pulses passed due to the coincidence of noise components in the compared signals and due to spurious similarities in the trends of the compared signals cancel each other out provided the integration periods are sufficiently long. Hence, a marked increase in the output of the integrator appears only when the gate arrangement passes a significant number of pulses of the same polarity in succession, which is indicative of an area of true correlation in the trends of the compared signals.

Figures 2, 3, 4, 5, 6:
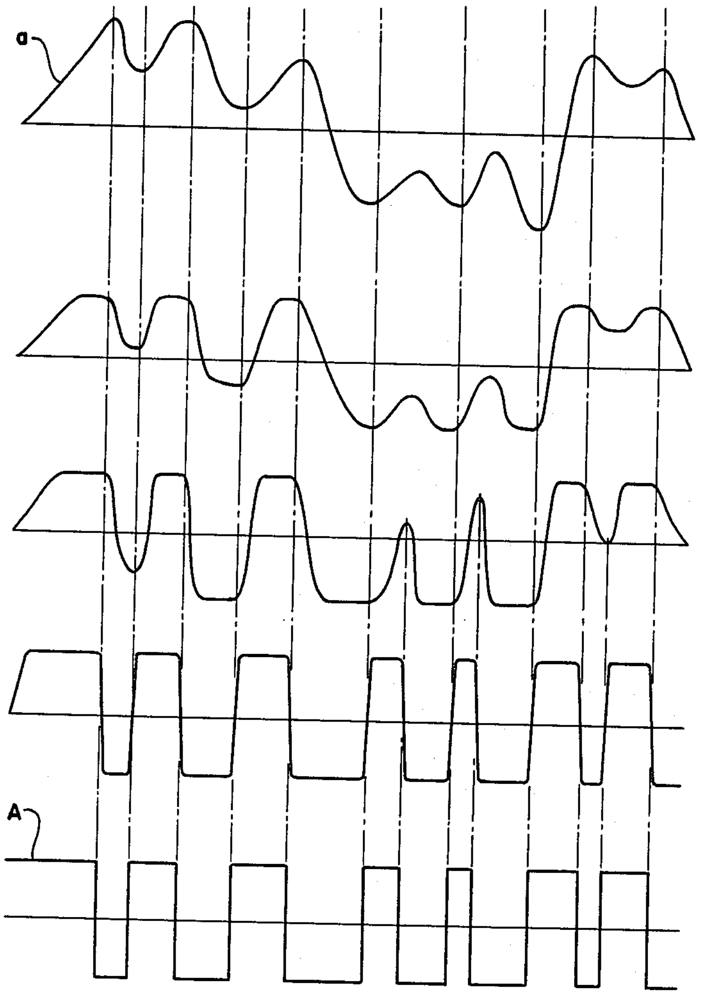
FIGURES 2 to 6 illustrate the consecutive stages in which the original signals are converted into pulse signals in accordance with the invention.

To convert continuously varying signals of the type illustrated by the lines *a* and *b* in FIGURES 1A and 1B into a series of pulses of equal amplitude but differing phase and polarity which reflect any changes in the trends of the original signals, such as is illustrated by the lines A and B in FIGURES 1A and 1B, the signals are first passed through D.C. restoration circuits represented by the blocks 10*a* and 10*b* in FIGURE 12 wherein a continuously varying signal of the shape shown in FIGURE 2 is changed into a signal of the shape shown in FIGURE 3. The outputs of the D.C. restoration circuits are passed through amplifiers represented by the blocks 12*a* and 12*b* respectively (FIGURE 12), which change them into the shape exemplified by FIGURE 4. From amplifiers 12*a* and 12*b* the signals are passed through another set of D.C. restoration circuits represented by the blocks 14*a* and 14*b* from which they emerge in the shape exemplified by FIGURE 5, and by repeated amplification in amplifiers represented by the blocks 16*a* and 16*b* respectively (FIGURE 12), they assume the shape illustrated in FIGURE 6, which corresponds to the series of square wave pulses represented by lines A and B in FIGURES 1A and 1B. The signals are now ready to be compared in the correlation gate arrangement of the present invention collectively identified by the reference number 20 in FIGURE 12.

In accordance with the invention we provide a gate arrangement that supplies pulses whenever two pulses of the same or opposite polarity are applied to its input side, but which distinguishes between pulses that are passed because of the coincidence, at its input side, of two pulses of identical polarity and pulses passed because of the coincidence of two pulses of opposite polarity so that the latter may be inverted before they are supplied to the integrator. For this purpose we split each of the converted signals A and B into their positive and negative halves A(+) and B(+) and A(−) and B(−) respectively, before they are delivered to the actual correlation gate arrangement 20.

Having again reference to FIGURE 12, the output of amplifier 16*a* is simultaneously applied to two gates 22*a* and 24*a* which are connected in parallel. Gate 22*a* is arranged to block negative pulses and pass positive pulses only, and gate 24*a* is arranged to supply pulses only when negative pulses are applied to its input side. Hence, the signal A(+) emerging from gate 22*a* is the positive half of the signal supplied by amplifier 16*a* as illustrated in the upper part of FIGURE 7A and the signal A(−) emerging from gate 24*a* is a sequence of (positive) pulses representing the negative half of the signal supplied by amplifier 16 as illustrated in the lower part of FIGURE 7A wherein the corresponding negative half of the original signal A is indicated in a phantom line. Similarly, the output B of amplifier 16*b* is simultaneously applied to two parallel connected gates 22*b* and 24*b*, and the signal B(+) emerging from gate 22*b* is the positive half of the signal B supplied by the amplifier 16*b* as shown in the upper part of FIGURE 7B and the signal B(−) emerging from the gate 24*b* is a (positive) signal representing the negative half of the signal B supplied by amplifier 16*b* as illustrated in the lower part of FIGURE 7B which also indicates the actual negative half of the original signal B in a phantom line.

The positive half A(+) of signal A and the positive half B(+) of signal B are delivered to an "and" gate represented by the block 26 in FIGURE 12 which supplies a pulse whenever there is a coincidence of pulses in the two signals. The signal emerging from gate 26 when signals A(+) and B(+) are applied to its input side is illustrated in FIGURE 8A. Pulses passed by gate 26 may be indicative of true correlation between the original signals *a* and *b*, but may also be indicative of false correlation produced by spurious similarities in the trends of the two signals or by coincident noise components of the same polarity. Similarly, the negative half A(−) of signal A and the negative half B(−) of signal B are delivered to an "and" gate represented by the block 28 in FIGURE 12, which supplies a pulse whenever there is a coincidence of pulses in the two signals A(−) and B(−) as illustrated in FIGURE 8B. Again, pulses passed by gate 28 may not only be indicative of true correlation between the original signals but may also appear as a result of spurious similarities between the two signals or of a coincidence of noise components of the same polarity.

The positive half A(+) of signal A and the negative half B(−) of signal B are jointly applied to yet another "and" gate represented by the block 30 in FIGURE 12, which passes pulses that are representative of the coincidence of pulses of opposite polarity in the compared signals as illustrated in FIGURE 8C. The pulses supplied by gate 30 are, therefore, at no time indicative of the existence of true correlation between the compared signals, they are passed as the result of the coincidence of noise components of opposite polarity and/or of accidental similarities of a symmetrically opposite character in the trends of the compared signals which may be termed "negative correlation" in contradiction to the hereinbefore explained output of gates 26 and 28, which may be termed "positive correlation" and which consists of "true" and "false" correlation. Similarly, the negative half A(−) of signal A and the positive half B(+) of signal B are compared in an "and" gate represented by the block 32 which supplies a pulse whenever there is a coincidence of pulses in signals A(−) and B(+) as illustrated in FIGURE 8D. As in the case of gate 30, the output of gate 32 is at no time indicative of true correlation, it represents "negative" correlation produced by spurious similarities of opposite polarity in the trend of the signals and the coincidence of noise components of opposite polarity.

The output of gates 26 and 28 (which may represent true correlation between the signals *a* and *b* but also represent false correlation) are delivered directly to the integrator which is represented by the block 34 in FIGURE 12. The outputs of gates 30 and 32, however, are first passed through an inverter represented by the block 36 from which they emerge as negative pulses as illustrated in FIGURE 9 so that they may reach the integrator 34 in a sate of opposite polarity with respect to the signals supplied from the gates 26 and 28. The composite signal supplied to the integrator consists of the output of gates 26 and 28 and the inverted output of gates 30 and 32 and is illustrated in FIGURE 10. In this manner any pulses supplied to the integrator 34 from gates 26 and 28 due to spurious similarities in the trends of the compared signals and/or due to the coincidence of noise components of identical polarity in said signals, i.e. any false correlation, is effectively balanced out in the integrator by the inverted false or "negative" correlation supplied by gates 30 and 32. Any pronounced rise in the output of said integrator, therefore, is caused by a substantial sequence of pulses of identical polarity in signals A and B and is always representative of true correlation between the compared signals.

The correlation arrangement illustrated in FIGURE 13 is similar to the correlation arrangement illustrated in FIGURE 12, and the same reference numerals have therefore been employed in both figures to designate identical components thereof. The arrangement illustrated in FIGURE 13 differs from the arrangement illustrated in FIGURE 12 merely in details of the actual correlation gate arrangement in that the former employs but three "and" gates where the latter requires four "and" gates and a pulse inverter. In both arrangements the outputs A, B of the amplifiers 16*a* and 16*b* are divided into their positive and negative halves A(+), A(−) and B(+), B(−) respectively, by pairs of parallel-connected "and" gates 22*a*, 24*a* and 22*b*, 24*b*; and the positive components A(+) and B(+) of the two signals are compared in an "and" gate 26 and their negative components A(−), B(−) are compared in an "and" gate 28, but instead of comparing the positive component A(+) of signal A with the negative component B(−) of signal B, and negative component A(−) of the former signals with the positive component B(+) of the latter signal in separate "and" gates 30 and 32 respectively, as is the case in the arrangement of FIGURE 12, the sums of the positive components of both signals, i.e. A(+) plus B(+) and the sums of the negative components of both signals, i.e. A(−) plus B(−) are jointly compared in a single "and" gate 40 (FIGURE 13) that is arranged to supply a negative pulse whenever the compared composite signals display a coincidence of pulses which occurs only when the compared signals display similarities of a symmetrically opposite character, as exist when there is a coincidence of noise components of opposite polarity in the compared signals and when spurious similarities of a symmetrically opposite nature appear in the trend of said signals. The reason for the described performance of gate 40 is that when the signals A(+) plus B(+) and A(−) plus B(−) are applied to said gate, A(+) and A(−) can never appear at the same time at the input side of the gate because A(+) and A(−) are part of the same signal and therefore cannot occur at the same time, and similarly B(+) and B(−) are part of the same signal and therefore can never occur at the same time. Hence, when two pulses do actually appear simultaneously at the input side of the gate in the composite signals applied to the gate, they can only be A(+) and B(−) or A(−) and B(+). Thus, gate 40 of the arrangement illustrated in FIGURE 13 operates in the same manner as the combined gates 30 and 32 of the arrangement illustrated in FIGURE 12. Its output pulses represent, therefore, negative correlation; and when they are delivered to the integrator 34 together with the outputs of gates 26 and 28 which represent a mixture of true and false correlation, the negative correlation supplied by gate 40 serves to balance out most if not all of the false correlation in the composite signal so that any increase in the output of the integrator 34 is due to, and is indicative of, the existence of true correlation between the compared signals *a* and *b*.

FIGURE 14 is a detailed circuit diagram of a transistorized version of the correlation arrangement represented by FIGURE 13, and to facilitate an understanding of FIGURE 14, the parts of the circuit arrangement corresponding to the blocks of FIGURE 13 have been marked out in broken lines and identified by the same reference numerals.

While we have described our invention with the aid of certain exemplary embodiments thereof, it will be understood that the invention is not limited to the specific circuit arrangements and the specific components thereof illustrated and described by way of example, which may be departed from without departing from the scope and spirit of the invention.

We claim:

1. An arrangement for ascertaining true correlation between two continuously varying signals comprising means for sensing positive correlation between the signals irrespective of whether it is true or false correlation as produced by spurious similarities in the trends of the signals and coincident noise components of the same polarity; means for sensing negative correlation between the signals representing coincident noise components of opposite polarity and similarities of a symmetrically opposite nature between the signals, and means for integrating continually the results of said sensing operations.

2. A correlation arrangement for ascertaining similarities in the trends of two continuously varying signals, comprising means for converting said signals into series of square wave pulses of equal amplitude but opposite polarity and varying duration representing the reversals in the trends of said signals, means for separating the resultant pulse series into pulse signals representing the positive and negative halves of said pulse series, gate means adapted to supply pulses whenever two pulses appear simultaneously at its input side, means for delivering said pulse signals to said gate means, a voltage integrator, and means delivering the output pulses of said gate means to said integrator.

3. Arrangement for ascertaining true similarities in the trend of two continuously varying signals, comprising means for converting said signals into square wave pulses of equal amplitude but varying duration and opposite polarity representing reversals in the trends of the signals, means for dividing the resultant series of pulses into their positive and negative halves, a plurality of gate means adapted to supply pulses upon coincident appearance, at their input side, of two pulses; means for delivering the positive halves of both said signals to a first of said gate means and the negative halves of both said signals to a second of said gate means causing said first and second gate means to supply output pulses indicative of true and false correlation between said signals, means for delivering the sum of the positive halves and the sum of the negative halves of said signals to a third of said gate means causing said third gate means to supply negative output pulses indicative of negative correlation between the signals, a voltage integrator, means for delivering the output pulses of all said gate means to said integrator to balance out false correlation pulses supplied to said integrator by said first and second gate with the output pulses of said third gate means and thus cause said integrator to supply an output that is representative of true correlation between the compared signals.

4. Arrangement for ascertaining true similarities in the trend of two continuously varying signals comprising means for converting said signals into square wave pulses of equal amplitude but varying duration and opposite polarity representing reversals in the trends of the signals, means for dividing the resultant series of pulses into their positive and negative halves, a plurality of gate means adapted to supply pulses upon coincident appearance, at their input side, of two pulses; means for delivering the positive halves of both signals to a first of said gate means and the negative halves of both signals to a second of said gate means causing said first and second gate means to supply output pulses indicative of true and false correlation between said signals, means for delivering the positive half of one of said signals and the negative half of the other signal to a third of said gate means and the negative half of said first signal and the positive half of said other signal to a fourth of said gate means causing said third and fourth gate means to supply output pulses indicative of negative correlation between said signals, a voltage integrator, means for delivering the output pulses of said first and second gates directly to said integrator, and means for delivering the output pulses of said third and fourth gate means in inverted condition to said integrator to balance out false correlation pulses supplied to said integrator by said first and second gate means and thus cause said integrator to supply an output that is representative of true correlation between the compared signals.

References Cited in the file of this patent

Rosenheck: "Detecting Signals by Polarity Coincidence," Electronics, Jan. 29, 1960 (pages 67–69 relied on).

Van Nostrand: "The International Dictionary of Physics and Electronics," 2nd edition, page 994 relied on.